United States Patent
Spanenberg

[11] Patent Number: 5,808,439
[45] Date of Patent: Sep. 15, 1998

[54] SATELLITE SMALL ANGLE TILTING MECHANISM

[76] Inventor: Peter E. Spanenberg, 1115 Monroe Turnpike, Monroe, Conn. 06468

[21] Appl. No.: 771,021

[22] Filed: Dec. 20, 1996

[51] Int. Cl.$^6$ .................................................. B25J 17/02
[52] U.S. Cl. .................. 318/648; 318/640; 318/632; 318/689; 74/471 XY; 248/178; 248/DIG. 13; 248/179
[58] Field of Search ..................... 318/560–690; 74/471 XY, 479, 89.15; 248/178, 179, DIG. 13, 487; 901/23

[56] References Cited

U.S. PATENT DOCUMENTS

| | | | |
|---|---|---|---|
| 4,556,182 | 12/1985 | Bentall et al. | 248/179 |
| 4,569,627 | 2/1986 | Simunovic | 414/735 |
| 4,919,382 | 4/1990 | Forman | 248/178 |
| 4,951,521 | 8/1990 | Jacobson | 74/479 |
| 5,271,290 | 12/1993 | Fischer | 74/471 XY |
| 5,392,709 | 2/1995 | Seyffert et al. | 101/216 |
| 5,410,944 | 5/1995 | Cushman | 91/520 |

*Primary Examiner*—Paul Ip

[57] ABSTRACT

A satellite mechanism is provided for tilting a directional device such as an earth sensor, telescope, antenna, reaction wheel, etc. through a small angle using flexural supports which provide rigidity in all directions. The tilting mechanism is flexurally supported (semi-fixed) on two points and moved (pivoted) through a small arc at a driven point by an eccentric drive. The flexurally supported points comprise a diaphragm whose periphery is clamped to a supporting structure while one side of a flexural pivot is attached at the center and the other side of the flexural pivot is attached to the earth sensor or pivoted element. The driven point has a similar diaphragm whose periphery is attached eccentrically to an harmonic drive motor. Accordingly, the directional device may be driven through a small angle without moving the entire satellite.

6 Claims, 3 Drawing Sheets

SATELLITE SMALL ANGLE TILTING MECHANISM

FIELD OF THE INVENTION

This invention relates to a tilting mechanism mounted on a satellite for moving a directional device such as an earth sensor through a small angle.

BACKGROUND OF THE INVENTION

It is sometimes desirable in a space application to move a directional device mounted on a satellite through a small angle. For example, it may be necessary to move a direction-oriented device such as a telescope or an antenna to align such a device with the intended target. Reaction wheels and earth sensors are other examples of apparatuses which might be advantageous to tilt through small angles without moving the entire satellite on which they are mounted.

In one illustrative example, a radiation balance type horizon sensor utilizes a plurality of radiation detectors positioned on each side of the horizon having electrical outputs used to provide an error transfer function which provides a means of locating the position of the horizon with respect to the space vehicle or satellite in which the detectors are mounted. With this type of sensor, a null point or zero output signal is indicative of an horizon crossing. If the horizon sensor on the satellite is slightly off line, a good null point may not be obtained, thereby producing errors. Accordingly, it would be desirable to slightly shift or adjust the positioning of the horizon sensor so that the detectors straddle the horizon to provide the desired null signal. Shifting the satellite in orbit over small angles may be costly and/or not attainable. The same might be the case for any directional type device which operates on a satellite.

In addition to being capable of being moved or tilted through a small angle, once such movement is effected, the supporting structure in which the movement takes place must be capable of providing rigidity in all directions so that a corrected positioning once attained is maintained.

SUMMARY OF THE INVENTION

Accordingly, it is an object of this invention to provide a new and improved method and apparatus for moving a directional device mounted on a satellite through a small angle without moving or repositioning the satellite.

A further object of this invention is to provide a new and improved mechanism for tilting a directional device mounted in a satellite providing great rigidity in all directions in order to maintain a new position once the directional device has been moved.

In carrying out this invention in one illustrative embodiment thereof, a satellite tilting mechanism is provided for tilting a movable body mounted on the satellite through a small angle comprising a supporting structure mounted on the satellite having a pair of flexurally supported points A and B and a driven point C on said movable body mounted in the supporting structure, a flexural pivot mounted between the center of points A and B on the movable body and on an eccentric drive having a drive axis coupled to the driven point C on the movable body for moving the movable body in an arc of a circle from the drive axis, thereby pivoting the movable body by the flexural pivot through a small angle with respect to the drive axis.

BRIEF DESCRIPTION OF THE DRAWINGS

The invention, together with further objects, features, aspects and advantages thereof, will be more clearly understood from the following description taken in connection with the accompanying drawings.

DESCRIPTION OF THE PREFERRED EMBODIMENTS

Figure 1:
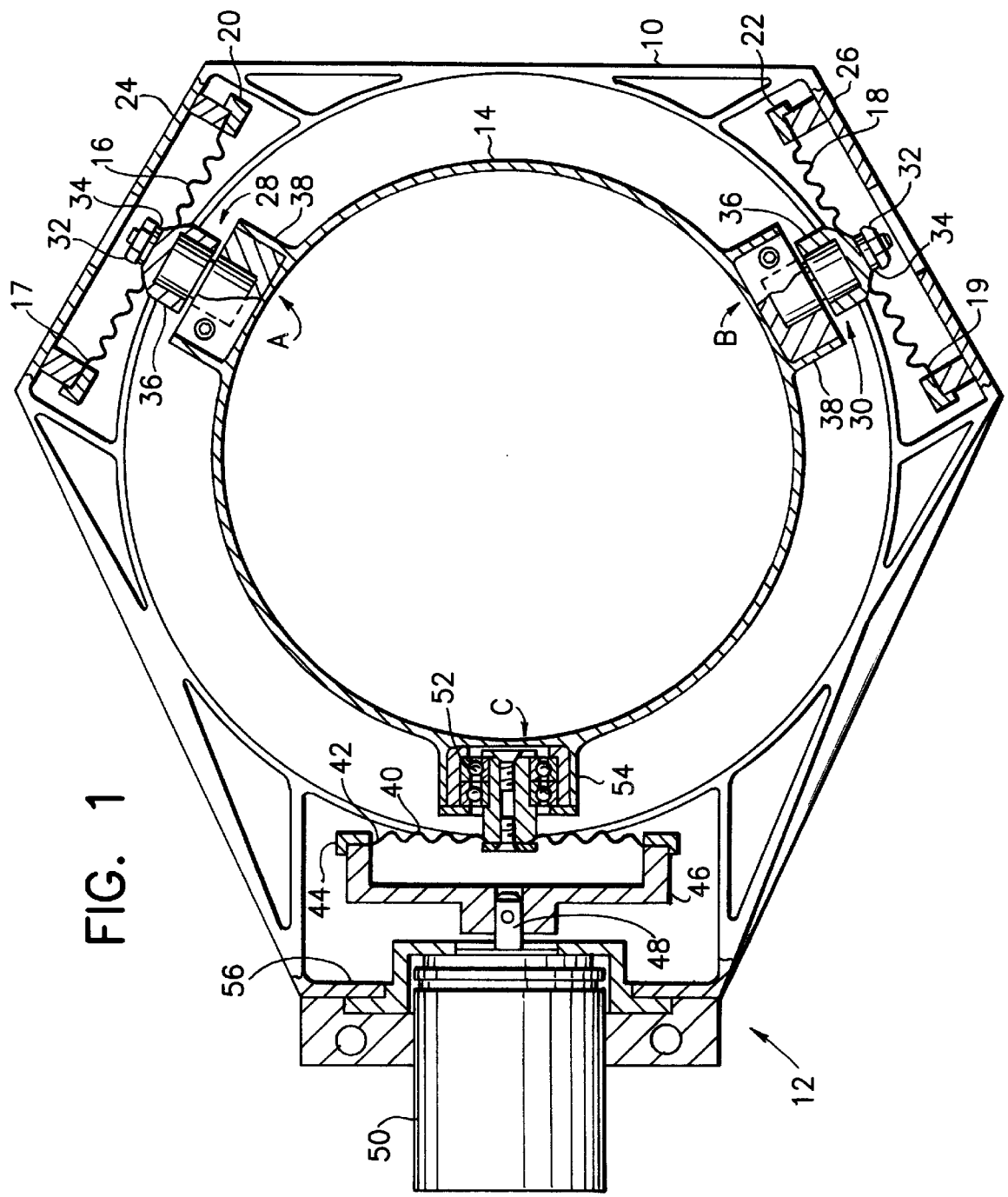
FIG. 1 is a top plan view partly in section of the tilt mechanism assembly in accordance with an illustrative embodiment of this invention.

Referring now to FIG. 1, a supporting frame, referred to generally with the reference numeral 10, is mounted on a satellite, spacecraft or the like in a suitable manner (not shown). The supporting structure or frame 10 houses a tilting mechanism referred to generally with the reference numeral 12 for housing and controlling the movement of an earth sensor assembly (ESA) 14 within the frame 10 and, accordingly, the movement of the ESA on the satellite in which the frame 10 is mounted. As pointed out, the invention is not limited to an ESA or horizon sensor but may be employed for any device which is desired to be remotely moved through a small angle on a spacecraft or satellite or the like such, for example, as an antenna, telescope, etc.

Figure 2:
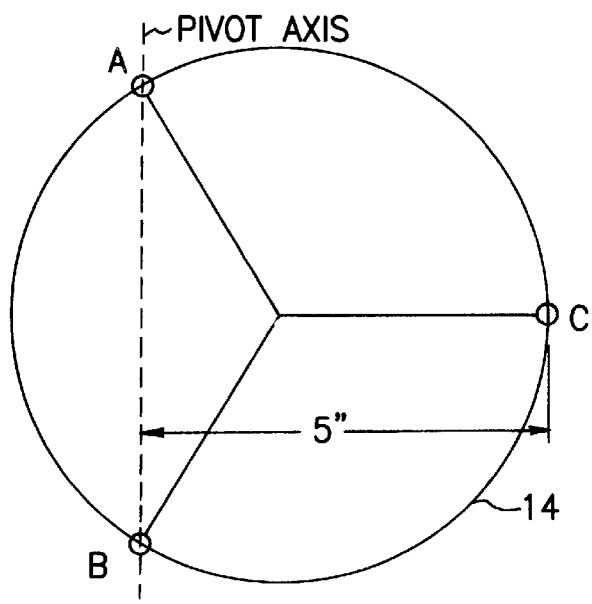
FIGS. 2 and 3 are schematic diagrams of the mechanism shown in FIG. 1 which are used for explanatory purposes.

The tilting mechanism 12 is used to tilt the sensor 14 through a small angle, e.g., ±2.5°. This small motion permits the use of flexural supports which provides great rigidity in all directions. The location of three points A, B and C on a rigid body, i.e., the sensor 14, as depicted in FIG. 2, with respect to the mounting structure or frame 10 fully determine the position of the sensor 14. Although three points A, B and C are necessary, the equal spacing as illustrated in FIG. 2 is not required.

Returning to FIG. 1, points A and B on the sensor 14 are flexurally supported while point C is the driven point. The flexurally supported points A and B comprise diaphragms or bellows 16 and 18 having their peripheries 17 and 19, respectively clamped by clamps 20 and 22, respectively to the frame 10. The diaphragms 16 and 18 are mounted on angled brackets 24 and 26, respectively by the clamps 20 and 22, respectively. Free flex pivots 28 and 30 representing points A and B have one side mounted by hex nuts 32 and washers 34 in yokes 36 to the center of bellows or diaphragms 16 and 18, respectively. The other sides of the flexural pivots 28 and 30 are rigidly attached to the sensor 14 in support cups 38.

The driven point C has a similar diaphragm 40 which has its periphery 42 clamped by clamp 44 to a yoke 46 driven by the shaft 48 of a harmonic drive motor 50 mounted in angled bracket 56 of the frame 10. A preloaded ball bearing pair 52 mounted in a support cup 54 on the sensor 14 is attached to the center of diaphragm 40 in place of the flex pivots 28 and 30 at points A and B, respectively. The motor 50 drives point C in a circle having a radius equal to the eccentricity of the diaphragm 40 with respect to the motor drive axis 58.

Figure 3:
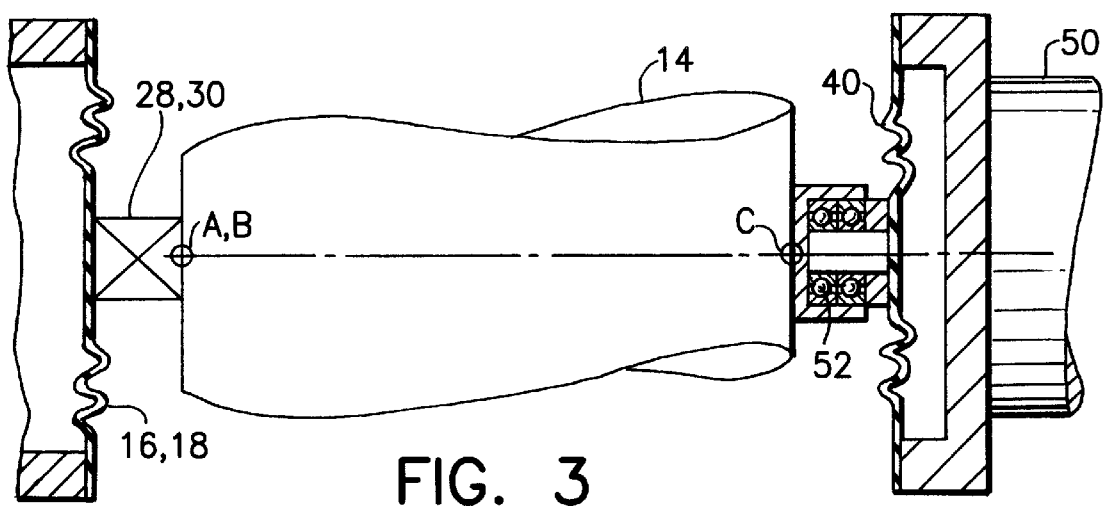
Figure 4:
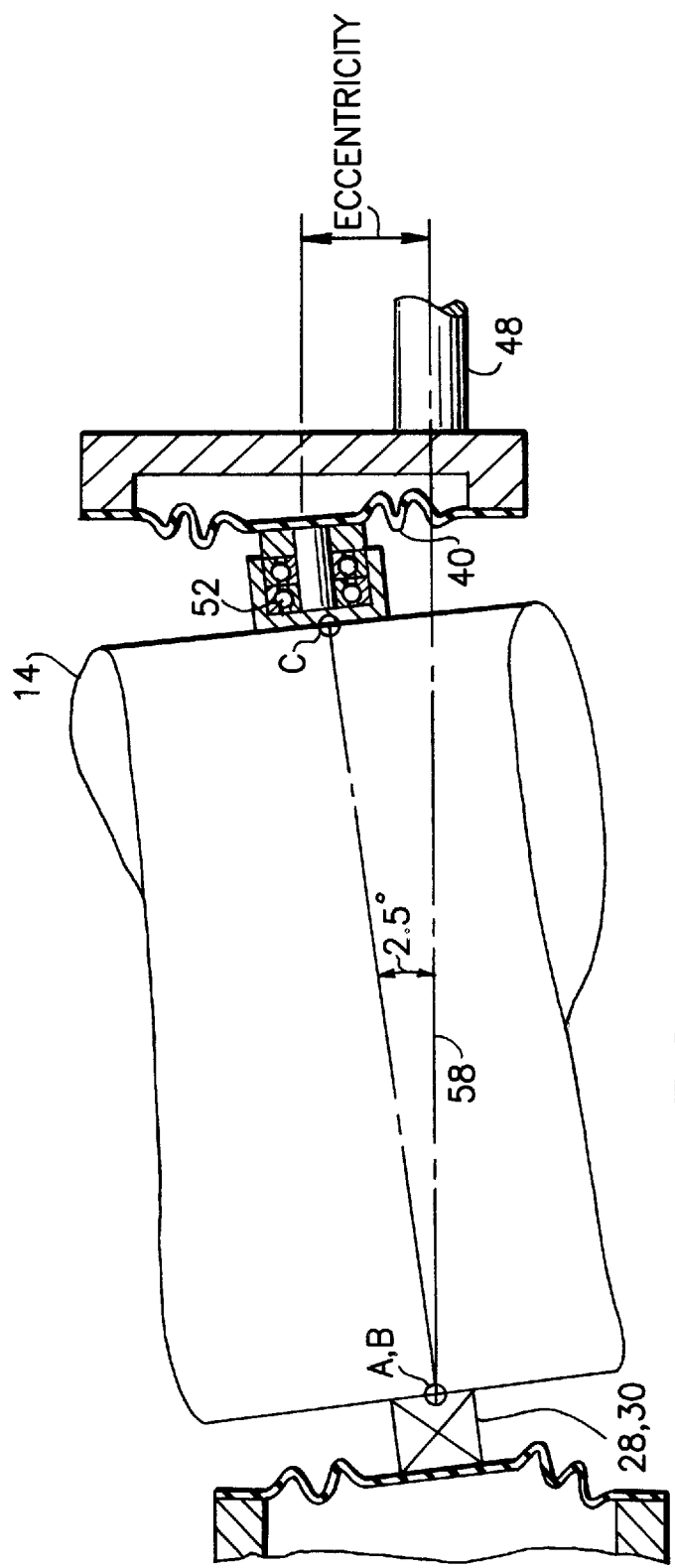
FIG. 4 is a schematic diagram similar to FIG. 3 illustrating an exaggerated depiction of motion of the tilting apparatus of the present invention.

To illustrate the operation of the tilting mechanism of the invention, FIG. 3 shows the mechanism schematically in a non-tilt position with point C aligned with the motor drive axis 58. FIG. 4 shows the effect of the eccentric motion on the flexural supports or diaphragms 16, 18 and 40 with the displacements being greatly exaggerated in order to illustrate the action. As an illustrative example for a tilt of 2.5°, the eccentricity will be 0.22 inches. The tilt of the driving diaphragm 40 must also be 2.5° but will be less for points A and B. The translation (T) for the spacing illustrated in FIG. 2 will be T=½ ×5"(1−cos. 2.50°)=0.0024 inches. The eccentric drive produces a rotation of ±2.5° as well as a tilt; however, this rotation corresponds to yaw to which the sensor is insensitive.

A single diaphragm has great compliance axially so there might be some concern about vibrations causing unacceptable axial displacements. However, the lateral stiffness of the other two diaphragms which make an angle of 30° with this axial motion prevent any axial resonances.

One type of harmonic drive motor which may be employed is a Schaeffer harmonic drive rotary actuator (Type 1) which has a gear ratio of 60/1. The motor is a stepper type with 3.75° steps in which one shaft revolution requires 60×3.75=5,760 steps. This large ratio provides a holding torque of 6 inch-pounds and insures that the position will remain fixed when the motor is unpowered. It should be noted that adding a second eccentric drive to points A or B will enable offsets in both pitch and roll. The flex pivots 28 and 30 may, for example, be Lucas/Bendix Free Flex pivots 5016-400.

Accordingly, a small angle tilt mechanism has been disclosed which permits aiming a device such as a horizon sensor mounted on a satellite or spacecraft without having to move the entire satellite. This permits aiming a mechanism on a satellite for acquisition or a fine tuning aiming adjustment which might be difficult or impractical, not to mention more costly, than controlling the small angle tilt mechanism in accordance with this invention.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A satellite tilting mechanism for tilting a movable body mounted on a satellite through a small angle comprising:

a supporting structure mounted on the satellite having a pair of flexurally supported points A and B and a flexurally driven point C on said movable body mounted in said supporting structure;

flexural pivots mounted between the center of points A and B on said movable body and said supporting structure;

an eccentric drive having a drive axis coupled to said flexurally driven point C on said movable body for moving said movable body in an arc of a circle from said drive axis, thereby pivoting said movable body by said flexural pivots through a small angle with respect to the drive axis.

2. The satellite tilting mechanism as claimed in claim 1 having a harmonic drive motor for eccentrically driving said movable body.

3. The satellite tilting mechanism as claimed in claim 1 wherein the supporting structure comprises diaphragms for supporting said movable body at points A, B and C.

4. The satellite tilting mechanism as claimed in claim 3 wherein said supporting structure includes three equally spaced angled brackets for mounting said flexural pivots and said eccentric drive in said supporting structure.

5. The satellite tilting mechanism as claimed in claim 4 having a harmonic drive motor for eccentrically driving said movable body.

6. A method of tilting a body mounted on a satellite through a small angle comprising the steps of:

rigidly holding a mounting structure having three flexural support points A, B and C on the satellite;

flexurally supporting a movable body in said mounting structure on points A and B of the mounting structure and providing a flexural pivot between points A and B and said satellite;

eccentrically driving said movable body at point C, thereby driving point C in a circle and pivoting said movable body through a small angle based on the amount of eccentrical drive on point C.

* * * * *